United States Patent
Visbal et al.

(10) Patent No.: US 12,043,372 B1
(45) Date of Patent: Jul. 23, 2024

(54) MICRO-CAVITY ACTUATOR FOR DELAY OF DYNAMIC STALL

(71) Applicant: Government of the United States, as represented by the Secretary of the Air Force, Wright-Patterson AFB, OH (US)

(72) Inventors: Miguel Visbal, Yellow Springs, OH (US); Daniel Garmann, Tipp City, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 268 days.

(21) Appl. No.: 17/495,884

(22) Filed: Oct. 7, 2021

Related U.S. Application Data (60) Provisional application No. 63/117,713, filed on Nov. 24, 2020.

(51) Int. Cl.
*B64C 21/10* (2006.01)
*B64C 21/08* (2023.01)

(52) U.S. Cl.
CPC .............. *B64C 21/08* (2013.01); *B64C 21/10* (2013.01); *B64C 2230/08* (2013.01); *B64C 2230/24* (2013.01)

(58) Field of Classification Search
CPC . B64C 21/10; B64C 2230/08; B64C 2230/24; F15D 1/0025; F15D 1/003
See application file for complete search history.

(56) References Cited

U.S. PATENT DOCUMENTS

| | | | | |
|---|---|---|---|---|
| 4,890,803 A * | 1/1990 | Smith | ....................... | B64C 3/48 244/219 |
| 5,891,551 A * | 4/1999 | Gibbs | ....................... | B63B 1/36 428/167 |
| 6,363,972 B1 * | 4/2002 | Umazume | ................. | B63B 1/36 138/177 |
| 6,457,654 B1 | 10/2002 | Glezer et al. | | |
| 6,705,838 B1 * | 3/2004 | Bak | ....................... | F03D 1/0641 416/243 |
| 8,192,161 B2 | 6/2012 | Baker et al. | | |
| 8,794,574 B2 | 8/2014 | Lang | | |

(Continued)

*Primary Examiner* — Nicholas McFall
*Assistant Examiner* — Terri L Filosi
(74) *Attorney, Agent, or Firm* — AFMCLO/JAZ; Matthew D. Fair (57) ABSTRACT

A micro-cavity passive actuator is configured to delay dynamic stall of an airfoil. The micro-cavity actuator is formed in the pressure sidewall surface proximate the leading edge of the airfoil. This cavity remains essentially inactive at low incidence. However, as the wing's effective angle of attack dynamically increases and the stagnation point displaces past the micro-cavity, the accelerating flow grazing the cavity induces a high-frequency resonance phenomenon (known as Rossiter modes). The self-generated small-scale disturbances are carried around the leading-edge through the boundary layer to the wing's upper side where the laminar separation bubble (LSB) amplifies these disturbances. This process delays LSB bursting and dynamic stall. The micro-cavity must be sized such that its naturally emitting oscillations are in a range of frequencies that can be amplified by the LSB.

20 Claims, 7 Drawing Sheets

(56) References Cited

U.S. PATENT DOCUMENTS

2011/0274875 A1    11/2011  Lang
2015/0017385 A1*   1/2015   Lang ................. F15D 1/003
                                                        428/141
2017/0253321 A1*   9/2017   Rolston ............... B64C 3/10

* cited by examiner

MICRO-CAVITY ACTUATOR FOR DELAY OF DYNAMIC STALL

PRIORITY

Pursuant to 37 C.F.R. § 1.78(a)(4), this application claims the benefit of and priority to prior filed Provisional Application Ser. No. 63/117,713, filed Nov. 24, 2020, which is expressly incorporated herein by reference.

RIGHTS OF THE GOVERNMENT

The invention described herein may be manufactured and used by or for the Government of the United States for all governmental purposes without the payment of any royalty.

TECHNICAL FIELD

The present disclosure generally relates to an airfoil and more particularly to a micro-cavity actuator for delaying dynamic or transient stall of the airfoil during operation.

BACKGROUND

Airfoils can be fixed or movable relative to a vehicle such as an airplane, helicopter or automobile and the like. Fixed airfoils include, but are not limited to aircraft wings and automobile spoilers. Examples of movable airfoils include helicopter rotors and airplane propellers. An airfoil generates an aerodynamic force as it moves through a fluid. Typically the faster the velocity the greater the aerodynamic force produced by the airfoil. Some airfoils have portions that are movable or variable such as ailerons, flaps, slats or other similar features useful for changing the direction of aerodynamic force. The aerodynamic forces include a lift component and a drag component as is known to those skilled in the art. The lift component is defined relative to a gravitational force and can act in an upward or downward direction. The drag force acts as an opposing force to the direction of movement. The lift force increases as a pitch or angle of attack increases up to the point where flow separation causes loss of the lift force. The loss of airfoil lift is known as an aerodynamic stall.

Dynamic stall is a transient condition experienced by aircraft wings in either high-angle-of-attack maneuvers or strong vertical gust encounters. The phenomenon also occurs in the retreating blades of a helicopter rotor in forward flight, as well as in both vertical and horizontal axis wind turbines. Dynamic stall allows an airfoil or wing to briefly exceed static-stall conditions with sustained or augmented lift. However, the temporarily elevated suction promotes the bursting of a leading-edge separation bubble and the undesirable formation, propagation, and subsequent shedding of large-scale vortices which induce potentially detrimental variations in aerodynamic loading and structural response. It is desirable to provide greater lift while delaying dynamic stall for enhanced airfoil operation and safety. Accordingly, there remains a need for further contributions in this area of technology.

SUMMARY

One embodiment of the present disclosure includes a modification to an airfoil that maintains aerodynamic lift while delaying the onset of dynamic stall conditions through relatively high angles of attack. Other embodiments include apparatuses, systems, devices, hardware, methods, and combinations wherein a micro-cavity is formed on a leading edge of the airfoil to alter a flow stream in a manner that causes a delay of a stalled condition as the effective angle of attack dynamically increases.

A properly-sized micro-cavity cut into the wing underside remains inactive at low incidence. However, as the wing's effective angle of attack increases, the flow stagnation point displaces past the micro-cavity and the accelerating flow grazing the cavity induces a high-frequency resonance phenomenon (known as Rossiter modes). The self-generated disturbances are carried around the leading-edge to the wing's upper side wherein the prevailing laminar separation bubble (LSB) amplifies these disturbances, delaying LSB bursting and subsequent dynamic stall. The cavity must be sized such that its naturally occurring resonance frequency is tuned to the receptivity of the LSB depending on the application.

The present technique has a number of advantages over complex actuators. It offers extreme simplicity of design with no required external power input since it is driven by the flow-induced cavity resonance. It is also very robust since no delicate actuators are needed, it is self-cleaning due to the energetic nature of the cavity, and it automatically starts forcing as needed only at high angles of attack where the velocity over the cavity is sufficiently high. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
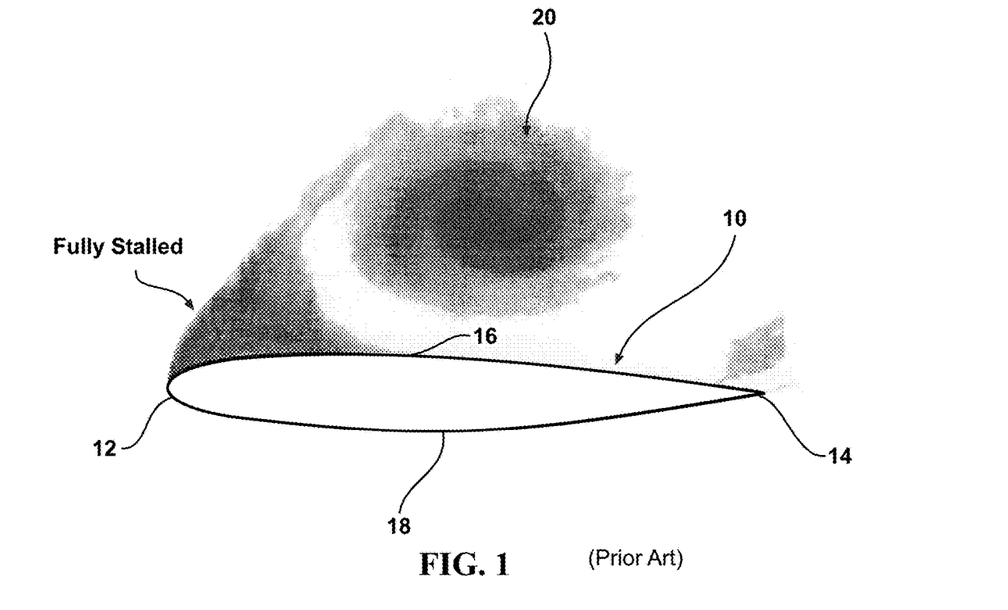
FIG. 1 is a cross-sectional view of a prior art airfoil showing a fully transient stalled condition.

Referring to FIG. 1, a cross-sectional view of a prior art airfoil 10 is depicted therein. The airfoil 10 is defined by a leading edge 12 at a forward end thereof and a trailing edge 14 at an aft end thereof. A suction sidewall 16 extends between the leading edge 12 the trailing edge 14 along a top of the airfoil 10 and a pressure sidewall 18 extends between the leading edge 12 and trailing edge 14 along a bottom of the airfoil. The prior art airfoil 10 illustrates a separation vortex 20 above the suction side 16 of the airfoil 10 which occurs in a fully dynamically stalled condition.

Figure 2:
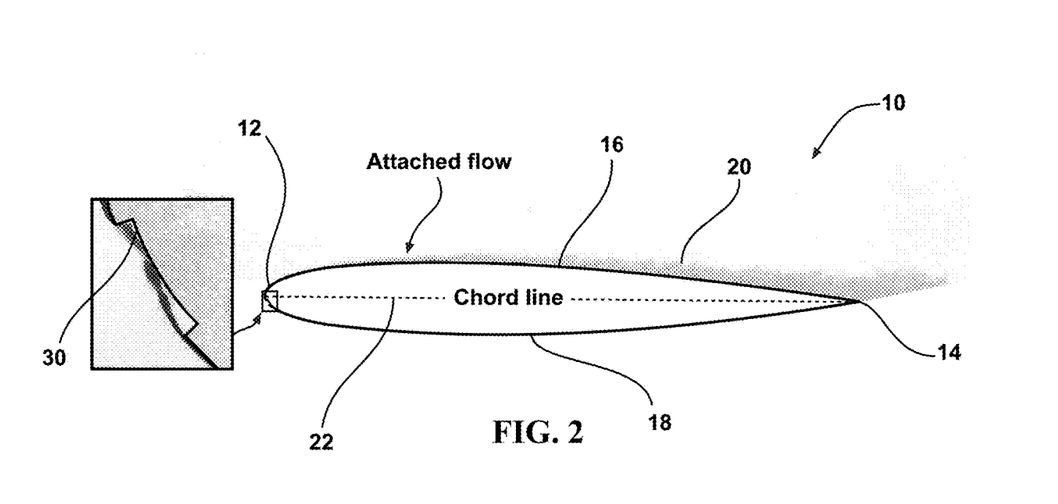
FIG. 2 is a cross-sectional view of an airfoil having a micro-cavity formed in a leading edge thereof passing through the same high effective angle-of-attack as FIG. 1.

Referring now to FIG. 2, a cross-sectional view of an airfoil 10 having a micro-cavity actuator 30 formed proximate the leading edge 12 thereof. It should be noted that the term airfoil is not limited in scope or embodiment. By way of example and not limitation the airfoil may be used on aircraft applications such as fixed or moveable wings, control surfaces, rotatable rotor blades and the like. Further, the airfoil may be used in automotive applications, power generating turbines or other technologies. A chord line 22 extends between the leading edge and the trailing edge 12, 14 respectively. The suction side surface 16 and the pressure side surface 18 form aerodynamic surfaces similar to that of the prior art airfoil of FIG. 1.

As described in more detail below, the micro-cavity actuator 30 causes a delay in dynamic stall onset through high effective transient angle of attack.

Figure 3:
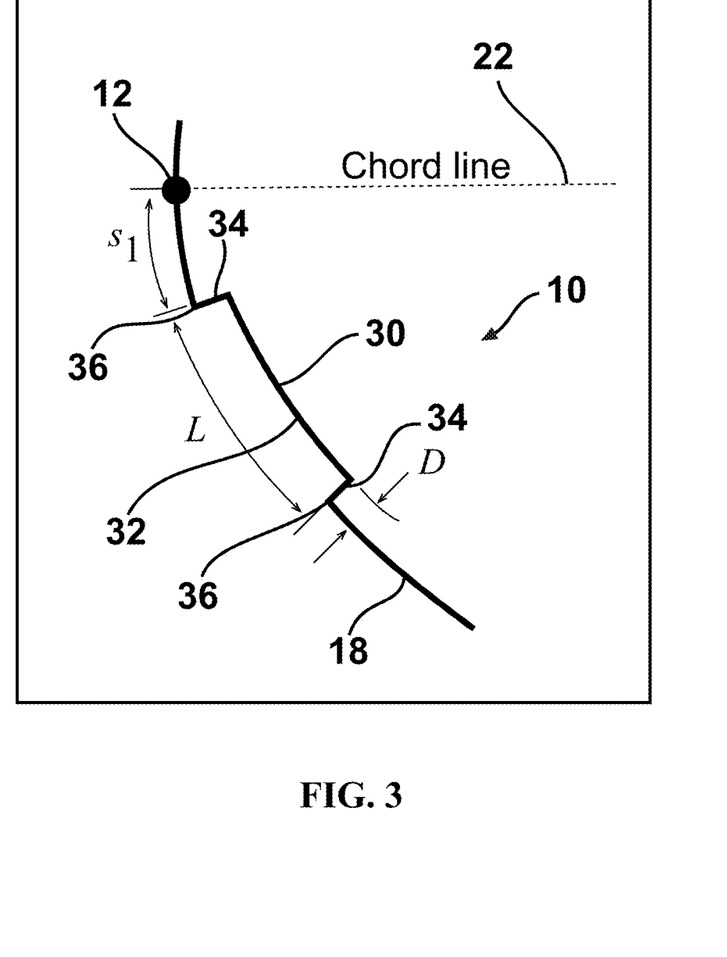
FIG. 3 is an enlarged view of the leading edge of the airfoil of FIG. 2 showing a resonating micro-cavity according to one embodiment of the present disclosure.

Referring now to FIG. 3, an enlarged schematic view of a portion of the airfoil 10 is illustrated. The leading edge 12 is defined by a point formed by the intersection of the cord line 22 and the forward end of the airfoil 10. A micro-cavity actuator 30 is defined by a recessed portion formed into the pressure sidewall 18 as illustrated. The micro-cavity actuator 30 includes a base wall 32 extending along a length "L" between a pair of shoulders 34. The shoulders 34 extend from corners 36 located at an intersection point with the pressure sidewall 18. The micro-cavity actuator 30 is defined by a recessed portion having a depth "D" from the pressure sidewall surface 18. The micro-cavity actuator 30 is positioned at a distance "S1" from the leading edge 12 from the airfoil 10. The magnitude of the depth D and distance S1 can vary depending on the size of the airfoil, application type and operational characteristics of the aircraft or other vehicle.

Figure 4A:
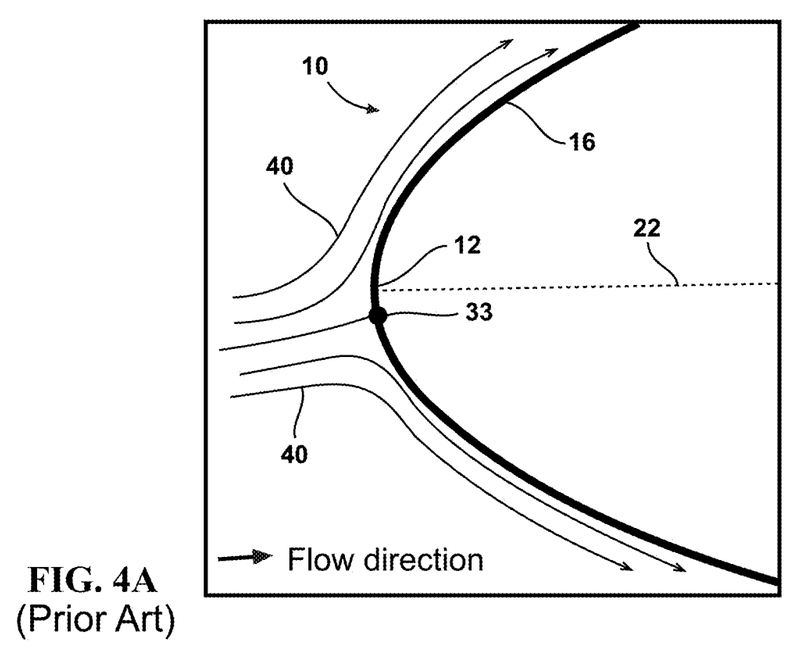
FIG. 4A is an enlarged view of the leading edge of the prior art baseline airfoil of FIG. 1 with flow streamlines at a relatively low angle of attack.
Figure 4B:
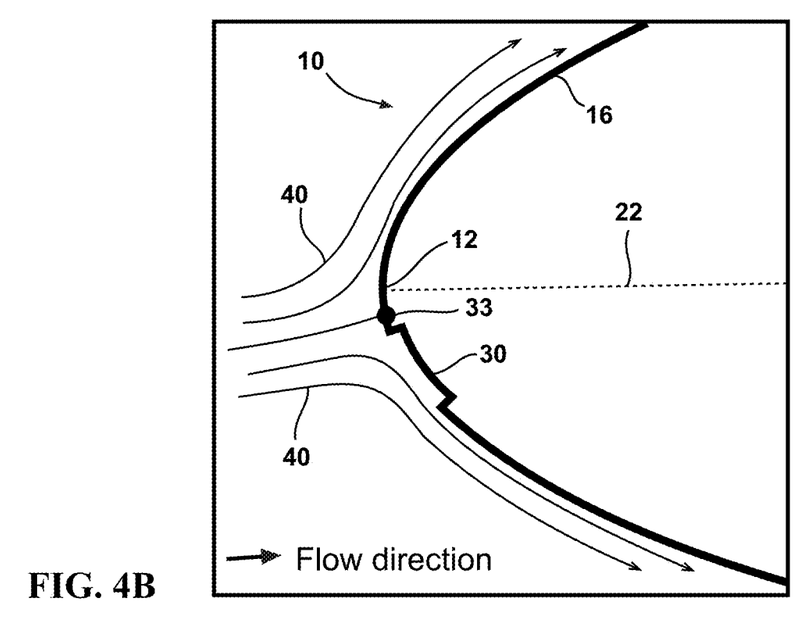
FIG. 4B is an enlarged view of the leading edge of the modified airfoil of FIG. 2 with flow streamlines at a relatively low angle of attack.
Figure 5A:
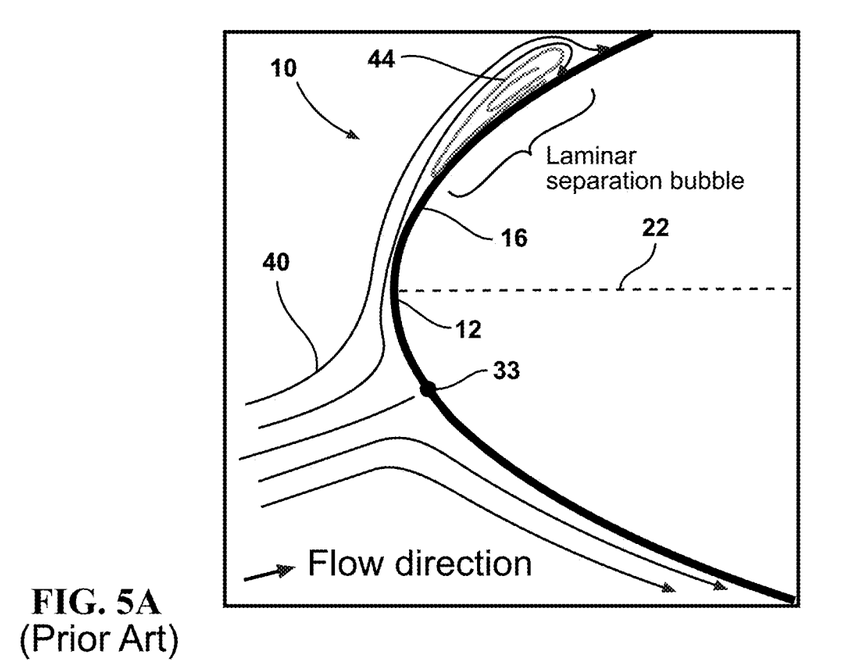
FIG. 5A is an enlarged view of the leading edge of the prior art baseline airfoil of FIG. 1 with flow streamlines at a relatively moderate angle of attack.
Figure 5B:
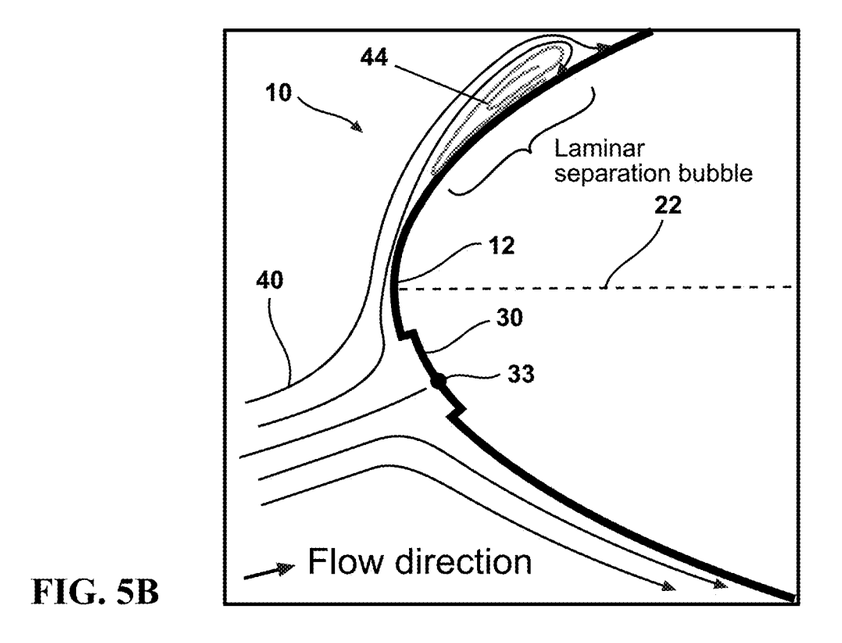
FIG. 5B is an enlarged view of the leading edge of the modified airfoil of FIG. 2 with flow streamlines at a relatively moderate angle of attack.
Figure 6A:
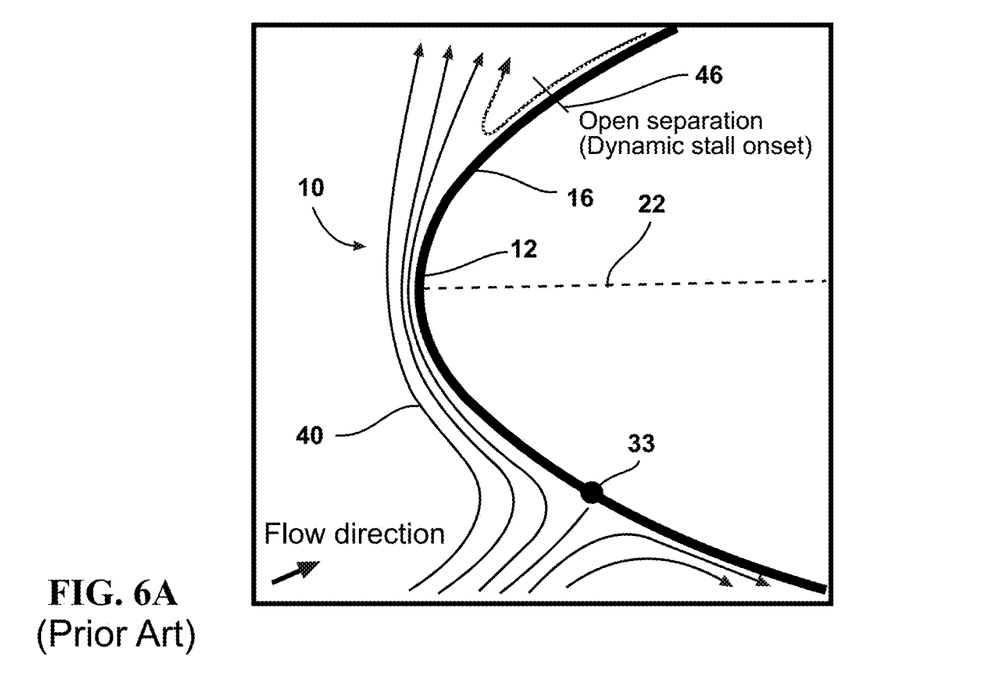
FIG. 6A is an enlarged view of the leading edge of the prior art baseline airfoil of FIG. 1 with flow streamlines at a relatively high angle of attack.
Figure 6B:
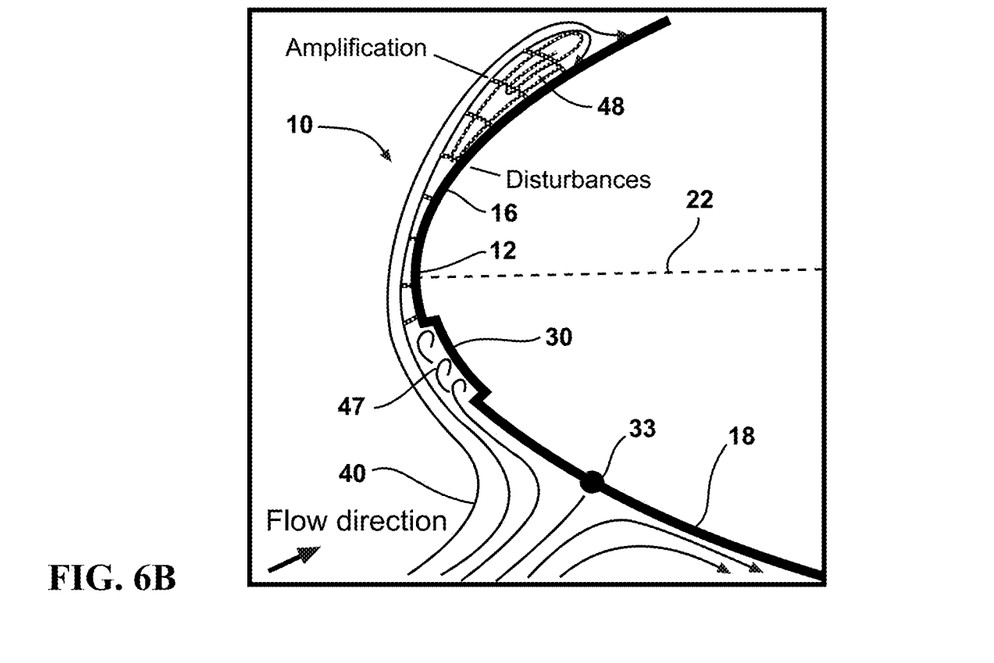
FIG. 6B is an enlarged view of the leading edge of the modified airfoil of FIG. 2 with flow streamlines at a relatively high angle of attack.

FIGS. 4-6 illustrate how the airflow streamlines 40 vary as the prior art baseline airfoils 10 and the modified inventive airfoils 10 experience dynamically increasing angles of attack. FIGS. 4a and 4b display a stagnation point 33 representing a position on the airfoil 10 where the incoming streamlines 40 deflect towards the suction (upper) and pressure (lower) sides of the airfoil 10. In this view, the stagnation point 33 is located just above the micro-cavity actuator 30, but below the cord line 22 which represents a relatively low effective angle of attack of the airfoil 10. The streamlines 40 in FIG. 4B show that the micro-cavity actuator 30 produces no resonance or flow perturbation as the stagnation point 33 is above the micro-cavity actuator 30.

Referring to FIG. 5A, the baseline airfoil 10 dynamically experiences a moderate effective angle of attack. The prevailing adverse pressure gradient on the suction surface 16 associated with flow deceleration induces the formation near the leading edge of a laminar separation bubble (LSB) 44 defined as a small closed region of flow separation. At relevant flight conditions (high Reynolds number of approximately 105<Re<107 or greater) this bubble can become very small on the order of 1% of airfoil chord and if closed (prior to dynamic stall) has little impact on loading.

For the modified airfoil of FIG. 5B, passing through a moderate effective angle of attack, the stagnation point 33 is located in the micro-cavity actuator 30. In this orientation, the micro-cavity produces little or no resonance and the flow streamlines are similar for the baseline and modified airfoils, including the presence of the LSB 44.

In FIG. 6A, the baseline airfoil dynamically experiences a high effective angle of attack. The severe pressure gradient has induced the bursting of the laminar separation bubble 46 and as a result the boundary layer completely separates from the suction side surface 16. The airfoil 10 will subsequently dynamically stall and abruptly lose lift.

In FIG. 6B for the modified airfoil reaching high effective angle of attack, the stagnation point 33 has progressed below the micro-cavity 30, and the streamlines 40 accelerate over the micro-cavity actuator 30. In this manner, the micro-cavity actuator 30 generates a resonance or flow disturbance 47 in the airflow streamlines 40. These self-generated small-scale disturbances are carried around the leading-edge by the boundary layer to the wing's upper side and are amplified by the stable laminar separation bubble 48. This process energizes the stable LSB 48 and delays its bursting and subsequent dynamic stall of the airfoil 10. In order to achieve this amplification, the cavity must be sized such that its naturally occurring discrete resonance frequencies (i.e. Rossiter modes) are tuned to the receptivity of the LSB 48. The micro-cavity actuator 30 therefore permits the airfoil 10 to operate transiently at a higher effective angle of attack relative to a standard airfoil prior to losing lift or completely stalling.

Figure 7A:
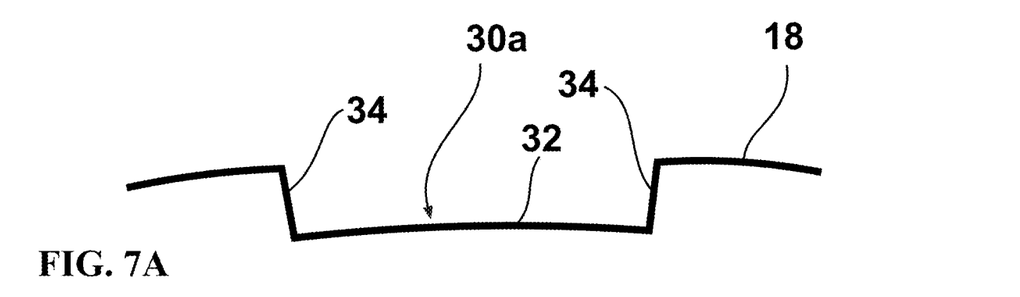
FIGS. 7A-7D show various micro-cavity actuator shapes according to some embodiments of the present disclosure.

Referring now to FIGS. 7A-7D, different forms of micro-cavity actuator 30 geometries are illustrated. The micro-cavity actuators 30a-30d depicted herein are exemplary in nature and are not limiting with respect to the invention. In FIG. 7A the micro-cavity actuator 30a includes shoulders 34 extending inward from the pressure side surface 18 approximately normal thereto. A base wall or floor 32 extends between each of the shoulders 34. In other forms the angle of the shoulders 34 relative to the pressure side surface 18 can be greater than 90° including angles up to 160° or greater. In an alternate form, a micro-cavity actuator 30a can include shoulders 34 having angles extending from the pressure side surface 18 at less than 90°.

Figure 7B:
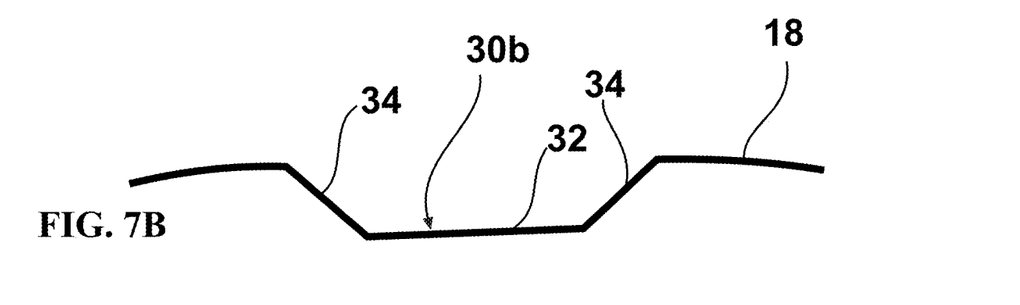
Figure 7C:
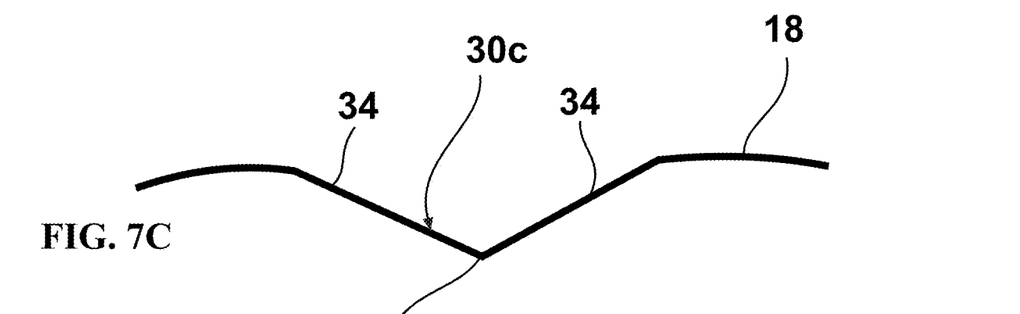
Figure 7D:
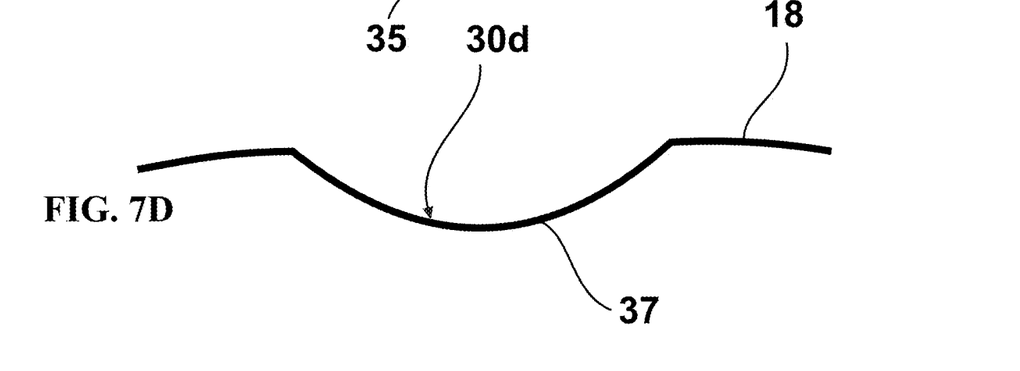

In FIG. 7B, the base wall or floor 32 of a micro-cavity actuator 30b is shorter in length than the base wall 32 of micro-cavity actuator 30a. In an alternate form shown in FIG. 7C, a micro-cavity actuator 30c can include shoulders 34 intersect together to form a Vertex 35. In this embodiment, there is no base wall or floor 32 as in the previous embodiments. Another embodiment shown in FIG. 7D, a micro-cavity actuator 30d includes a recessed arcuate surface 37 extending from the pressure side surface 18 at either end. In some forms, the shoulders 34 and base walls 32 of the micro-cavity actuator 30 can include a combination of arcuate and linear patterns or shapes.

Figure 8:
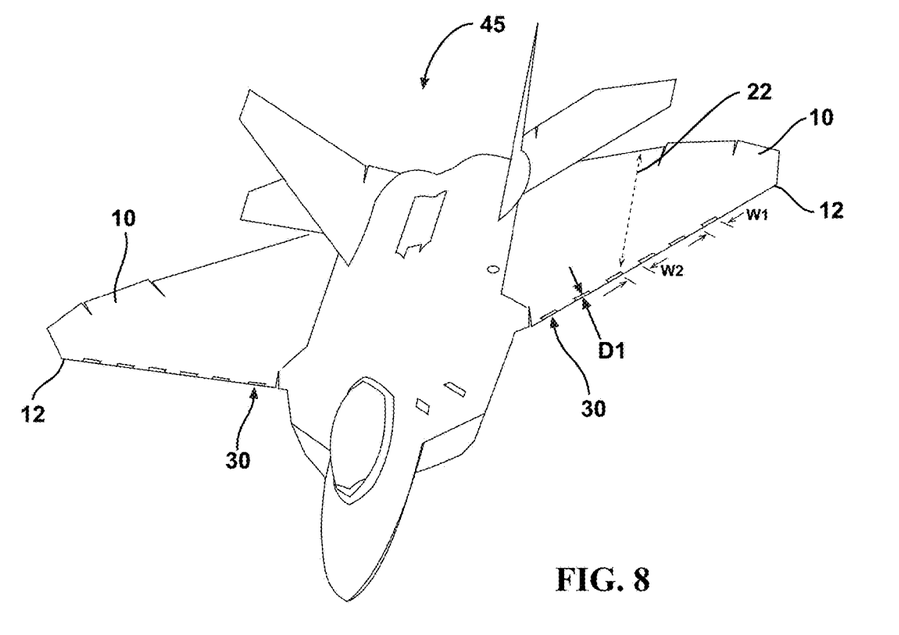
FIG. 8 illustrates an aircraft having a plurality of discrete micro-cavity actuators extending intermittently along a leading edge of a wing.

Referring now to FIG. 8, an exemplary aircraft 45 is illustrated with one embodiment of a micro-cavity actuator 30. In this embodiment, a plurality of micro-cavities 30 are positioned intermittently along the leading edge 12 of the airfoil 10. It should be reiterated that while the airfoil 10 is illustrated as a wing for an aircraft, the airfoil 10 is not limited to a wing or even an aircraft application. The micro-cavity actuators 30 can be defined by a width W1 and a length of the space between adjacent micro-cavity actuators 30 defined as W2. In some forms, the width W1 can be greater than the length W2 of the space therebetween, however in other forms the width W1 can be equal to or less than the length W2 of the space therebetween. The micro-cavity actuators 30 are further defined by a depth D1. It should be understood that the magnitude of W1, W2 and D1 will vary depending on the size, application and operational characteristics of the airfoil 30.

Figure 9:
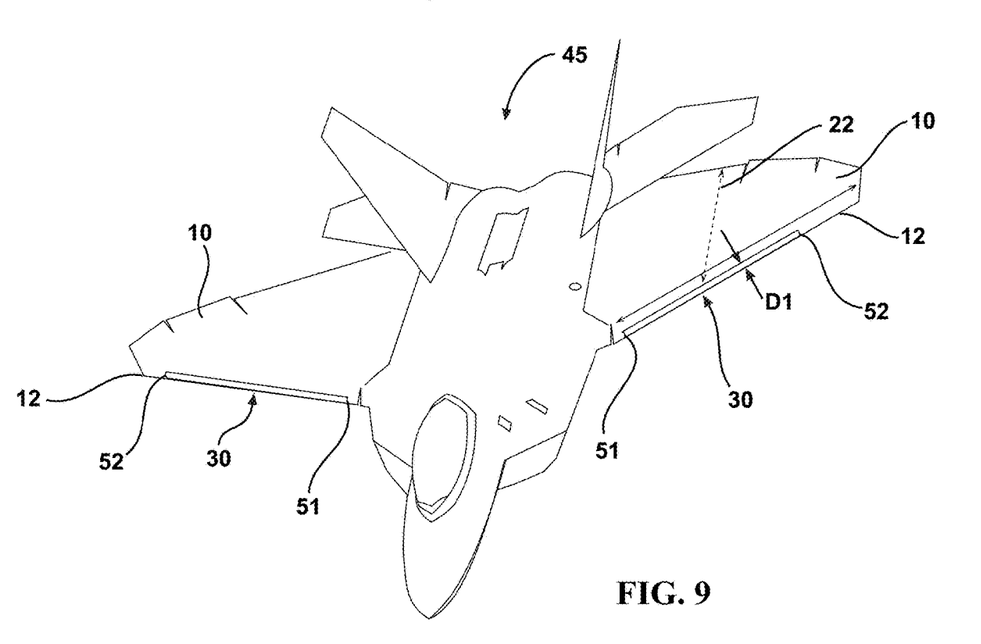
FIG. 9 illustrates an aircraft having a single micro-cavity actuator extending along a leading edge of a wing.

Referring now to FIG. 9, an alternate embodiment of the micro-cavity device 30 is illustrated. An aircraft 45 includes a single micro-cavity actuator 30 extending across substantially the entire leading edge 12 of the airfoil 10. The width of the micro-cavity actuator 30 is bounded between a first end 51 proximate the root of the airfoil 10 and a second end 52 proximate the tip of the airfoil 10. The single micro-cavity 30 can be placed anywhere along the leading edge 12 of the airfoil between the root and the tip as desired.

In one aspect the present disclosure includes an airfoil comprising: a leading edge; a trailing edge; a chord defined as a straight line extending between the leading edge and the trailing edge; a suction sidewall extending between the leading edge and trailing edge above the chord; a pressure sidewall extending between the leading edge and trailing edge below the chord; and at least one micro-cavity actuator formed in the pressure sidewall between the leading edge and a stagnation point at high effective angles of attack.

In refining aspect, the at least one micro-cavity actuator includes a recessed portion in the outer sidewall of the airfoil; wherein the recessed portion includes a first shoulder and an opposing second shoulder extending inward approximately normal from the pressure sidewall; and a base wall extending between the first and second shoulders approximately parallel to the pressure sidewall; wherein the recessed portion includes a first shoulder and an opposing second shoulder extending inward at an obtuse angle from the pressure sidewall; and a base wall extending between the first and second shoulders approximately parallel to the pressure sidewall; wherein the recessed portion includes a first shoulder and an opposing second shoulder extending angularly inward from the pressure sidewall toward one another to form a vertex therebetween; wherein the recessed portion includes an arcuate base wall extending between first and second shoulders intersecting the pressure sidewall; wherein the at least one micro-cavity actuator includes a plurality of micro-cavities positioned intermittently along the leading edge of the airfoil from a root to a tip; wherein a space between each adjacent micro-cavity actuator is less than a length of the micro-cavity actuator, wherein a length of the micro-cavity actuator is less than half of the width of the micro-cavity actuator; and wherein the at least one micro-cavity actuator is a single micro-cavity actuator extending substantially along an entire span of the airfoil from a root to a tip.

In another aspect, the present disclosure includes an aircraft comprising: a fuselage; an airfoil operably associated with the fuselage; and at least one micro-cavity actuator formed adjacent a leading edge of the airfoil on a pressure side thereof.

In refining aspects, the airfoil forms a portion of a fixed wing; wherein the airfoil is movable relative to the fuselage; wherein the airfoil forms a portion of a rotor or a variable positioned wing; wherein the micro-cavity actuator includes a recessed portion extending inward from the pressure sidewall of the airfoil; wherein the recessed portion is defined by a pair of opposing sidewalls protruding inwardly from an outer surface of the airfoil between an angle of approximately 90 degrees and 150 degrees; wherein the recessed portion is defined by a single arcuate wall extending inward from opposing sides thereof; wherein the at least one micro-cavity actuator is a single micro-cavity actuator extending substantially along an entire length of the airfoil from a root to a tip; and wherein the at least one micro-cavity actuator is a plurality of micro-cavity actuators formed along a length of the airfoil from a root to a tip.

In another aspect, a method for delaying stall of an airfoil comprises: forming a micro-cavity actuator proximate a leading edge on a pressure side of the airfoil; moving the airfoil through a fluid flow; generating a flow activated resonance within the micro-cavity; and retaining a closed laminar separation bubble adjacent a suction sidewall of the airfoil to delay dynamic stall of the airfoil; wherein the micro-cavity actuator includes one or more cavities extending along a majority of a length of the leading edge of the airfoil.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An airfoil comprising:
    a leading edge;
    a trailing edge;
    a chord defined as a straight line extending between the leading edge and the trailing edge;
    a suction sidewall extending between the leading edge and trailing edge above the chord;
    a pressure sidewall extending between the leading edge and trailing edge below the chord;
    at least one micro-cavity actuator formed in the pressure sidewall; and
    wherein the at least one micro-cavity actuator generates a resonance that is carried around the leading edge by a boundary layer to the suction sidewall of the airfoil.

2. The airfoil of claim 1, wherein the at least one micro-cavity actuator includes a recessed portion in the pressure sidewall of the airfoil.

3. The airfoil of claim 2, wherein the recessed portion includes a first shoulder and an opposing second shoulder extending inward normal from the pressure sidewall; and
    a base wall extending between the first and second shoulders parallel to the pressure sidewall.

4. The airfoil of claim 2, wherein the recessed portion includes a first shoulder and an opposing second shoulder extending inward at an obtuse angle from the pressure sidewall; and
    a base wall extending between the first and second shoulders parallel to the pressure sidewall.

5. The airfoil of claim 2, wherein the recessed portion includes a first shoulder and an opposing second shoulder extending angularly inward from the pressure sidewall toward one another to form a vertex therebetween.

6. The airfoil of claim 2, wherein the recessed portion includes an arcuate base wall extending between first and second shoulders intersecting the pressure sidewall.

7. The airfoil of claim 1, wherein the at least one micro-cavity actuator includes a plurality of micro-cavities positioned intermittently along the leading edge of the airfoil from a root to a tip.

8. The airfoil of claim 7, wherein a space between each adjacent micro-cavity actuator is less than a length of the micro-cavity actuator.

9. The airfoil of claim 8, wherein a length of the micro-cavity actuator is less than half of the width of the micro-cavity actuator.

10. The airfoil of claim 1, wherein the at least one micro-cavity actuator is a single micro-cavity actuator extending along a span of the airfoil between a root and a tip.

11. An aircraft comprising:
    a fuselage;
    an airfoil operably associated with the fuselage; and
    at least one micro-cavity actuator formed adjacent a leading edge of the airfoil on a pressure side thereof;
    wherein the micro-cavity actuator includes a recessed portion extending inward from the pressure sidewall of the airfoil and is positioned between a stagnation point and a leading edge of the airfoil to generate a resonance in an air flow moving from the stagnation point past the micro-cavity actuator toward a laminar separation bubble on the suction side surface of the airfoil.

12. The aircraft of claim 11, wherein the airfoil forms a portion of a fixed wing.

13. The aircraft of claim 11, wherein the airfoil is movable relative to the fuselage.

14. The aircraft of claim 13, wherein the airfoil forms a portion of a rotor or a variable positioned wing.

15. The aircraft of claim 11, wherein the recessed portion is defined by a pair of opposing sidewalls protruding inwardly from an outer surface of the airfoil between an angle of 90 degrees and 150 degrees.

16. The aircraft of claim 11, wherein the recessed portion is defined by a single arcuate wall extending inward from opposing sides thereof.

17. The aircraft of claim 11, wherein the at least one micro-cavity actuator is a single micro-cavity actuator extending along a length of the airfoil between a root and a tip.

18. The aircraft of claim 11, wherein the at least one micro-cavity actuator is a plurality of micro-cavity actuators formed along a length of the airfoil from a root to a tip.

19. A method for delaying stall of an airfoil comprising:
    forming a micro-cavity actuator proximate a leading edge on a pressure side of the airfoil; moving the airfoil through a fluid flow;
    generating a flow activated resonance within the micro-cavity actuator when a stagnation point of the fluid flow is further away from a leading edge of the airfoil than a position of the micro-cavity actuator; and
    retaining a closed laminar separation bubble adjacent a suction sidewall of the airfoil as the activated resonance propagates from the pressure side to the suction side of the airfoil to delay dynamic stall of the airfoil.

20. The method of claim 19, wherein the micro-cavity actuator includes one or more cavities extending along a length of the leading edge of the airfoil.

\* \* \* \* \*